US007158555B2

(12) United States Patent
Momiuchi et al.

(10) Patent No.: US 7,158,555 B2
(45) Date of Patent: Jan. 2, 2007

(54) SOLID-STATE LASER DEVICE USING TWO RESONATORS ON THE SAME AXIS AND DUAL MONITORS

(75) Inventors: Masayuki Momiuchi, Tokyo-to (JP); Taizo Eno, Tokyo-to (JP); Yoshiaki Goto, Tokyo-to (JP)

(73) Assignee: Kabushiki Kaisha Topcon, Tokyo-to (JP)

( * ) Notice: Subject to any disclaimer, the term of this patent is extended or adjusted under 35 U.S.C. 154(b) by 291 days.

(21) Appl. No.: 10/803,504

(22) Filed: Mar. 18, 2004

(65) Prior Publication Data

US 2004/0190574 A1 Sep. 30, 2004

(30) Foreign Application Priority Data

Mar. 24, 2003 (JP) ............................. 2003-081142

(51) Int. Cl.
*H01S 3/08* (2006.01)
(52) U.S. Cl. .......................................... 372/92; 372/69
(58) Field of Classification Search ................ 372/97, 372/25, 30, 92, 93, 69, 20
See application file for complete search history.

(56) References Cited

U.S. PATENT DOCUMENTS

| 5,007,059 A | * | 4/1991 | Keller et al. ................... 372/18 |
| 5,077,750 A | * | 12/1991 | Pocholle et al. .............. 372/68 |
| 5,172,264 A | * | 12/1992 | Morrow ...................... 359/349 |
| 5,418,810 A | * | 5/1995 | Eguchi et al. ................. 372/98 |

* cited by examiner

*Primary Examiner*—Armando Rodriguez
*Assistant Examiner*—Tuan N. Nguyen
(74) *Attorney, Agent, or Firm*—Nields & Lemack

(57) ABSTRACT

A solid-state laser device, which comprises a first resonator for projecting a first laser beam and a second resonator for projecting a second laser beam, wherein the first resonator and the second resonator commonly share a part of an optical axis and an output mirror, and which comprises a first light emitting unit for the first resonator, a second light emitting unit for the second resonator, a monitoring means for splitting and monitoring a part of the first laser beam and for splitting and monitoring a part of the second laser beam among the laser beams projected from the output mirror, and a control unit for controlling at least one of the first light emitting unit and the second light emitting unit based on a detection result from the monitoring means.

8 Claims, 5 Drawing Sheets

SOLID-STATE LASER DEVICE USING TWO RESONATORS ON THE SAME AXIS AND DUAL MONITORS

BACKGROUND OF THE INVENTION

The present invention relates to a solid-state laser device, and in particular, to a solid-state laser device in which output of a semiconductor pumped solid-state laser device is controlled.

Referring to FIG. 5, description will be given below on general features of a semiconductor pumped solid-state laser device.

In FIG. 5, reference numeral 1 denotes a light emitting unit comprising a single diode or a plurality of laser diodes for emitting a laser beam with a wavelength of $\lambda$ as an excitation light, and the numeral 2 denotes a resonator for outputting a laser beam with a wavelength of $\lambda 1$.

The resonator 2 primarily comprises a reflection mirror 3, an output mirror 4 disposed at a position opposite to the reflection mirror 3, and a laser crystal 5 positioned on an optical axis of the output mirror 4 and the reflection mirror 3. On the reflection mirror 3 and the output mirror 4, there are formed a dielectric reflection film 6 and a dielectric reflection film 7.

A half-mirror 8 is provided on an optical axis on an output side of the resonator 2. The half-mirror 8 splits a part of the laser beam outputted from the resonator 2 and enters the laser beam to a monitor photodetector 9. A photodetection signal from the monitor photodetector 9 is inputted to a control unit 11. The control unit 11 controls the light emitting unit 1 so that intensity of an output light from the resonator 2 can be controlled and that output conditions of a pulsed light, a continuous light, etc. can be controlled.

As the laser crystal 5, Nd:YVO$_4$ or YAG (yttrium aluminum garnet) doped with Nd$^{3+}$ ions is used.

In the semiconductor pumped solid-state laser device described above, when the light emitting unit 1 is turned on, an excitation light is projected to the resonator 2 through the reflection mirror 3. The excitation light passes through the laser crystal 5 and is pumped between the dielectric reflection film 6 and the dielectric reflection film 7 and is amplified. Then, a laser beam 12 with the wavelength $\lambda 1$ is outputted through the output mirror 4.

The laser beam 12 is projected through the half-mirror 8 and is split by the half-mirror 8, and a part of the laser beam 12 enters the monitor photodetector 9. When the monitor photodetector 9 receives the part of the laser beam 12, the photodetection signal is issued. Then, the photodetection signal is inputted to the control unit 11. Based on the photodetection signal, the control unit 11 controls the light emitting unit 1 so that intensity and output condition of the laser beams 12 can be controlled to the predetermined intensity and condition.

In an application previously filed (Japanese Patent Application 2002-335683), the present applicants proposed a solid-state laser device provided with a plurality of resonators, which commonly share an optical axis.

The solid-state laser device as proposed above is advantageous in that output of the laser beam can be increased, or a plurality of laser beams with different wavelengths can be outputted, and the device can be designed in simple structure.

In order that the desired output condition of the laser beam is obtained by a solid-state laser device with a plurality of resonators, the resonators must be respectively and independently controlled.

SUMMARY OF THE INVENTION

It is an object of the present invention to provide a solid-state laser device provided with a plurality of resonators, by which output control of laser beams can be improved.

To attain the above object, the solid state laser device according to the present invention comprises a first resonator for projecting a first laser beam and a second resonator for projecting a second laser beam, wherein the first resonator and the second resonator commonly share a part of an optical axis and an output mirror, and which comprises a first light emitting unit for the first resonator, a second light emitting unit for the second resonator, a monitoring means for splitting and monitoring a part of the first laser beam and for splitting and monitoring a part of the second laser beam among the laser beams projected from the output mirror, and a control unit for controlling at least one of the first light emitting unit and the second light emitting unit based on a detection result from the monitoring means. Also, the present invention provides the solid-state laser device as described above, wherein the monitoring means comprises a first monitoring means for monitoring the first laser beam and a second monitoring means for monitoring the second laser beam, and the control unit can independently control the first light emitting unit and the second light emitting unit. Further, the present invention provides the solid-state laser device as described above, wherein a wavelength of the first laser beam is different from a wavelength of the second laser beam. Also, the present invention provides the solid-state laser device as described above, wherein a direction of polarization of the first laser beam is different from a direction of polarization of the second laser beam. Further, the present invention provides the solid-state laser device as described above, wherein the control unit controls one of the first light emitting unit and the second light emitting unit so that a short-time pulse with higher output peak value can be issued and the control unit controls the other of the light emitting units to continuous or long-time pulse with lower output peak value.

DETAILED DESCRIPTION OF THE PREFERRED EMBODIMENTS

Figure 1:
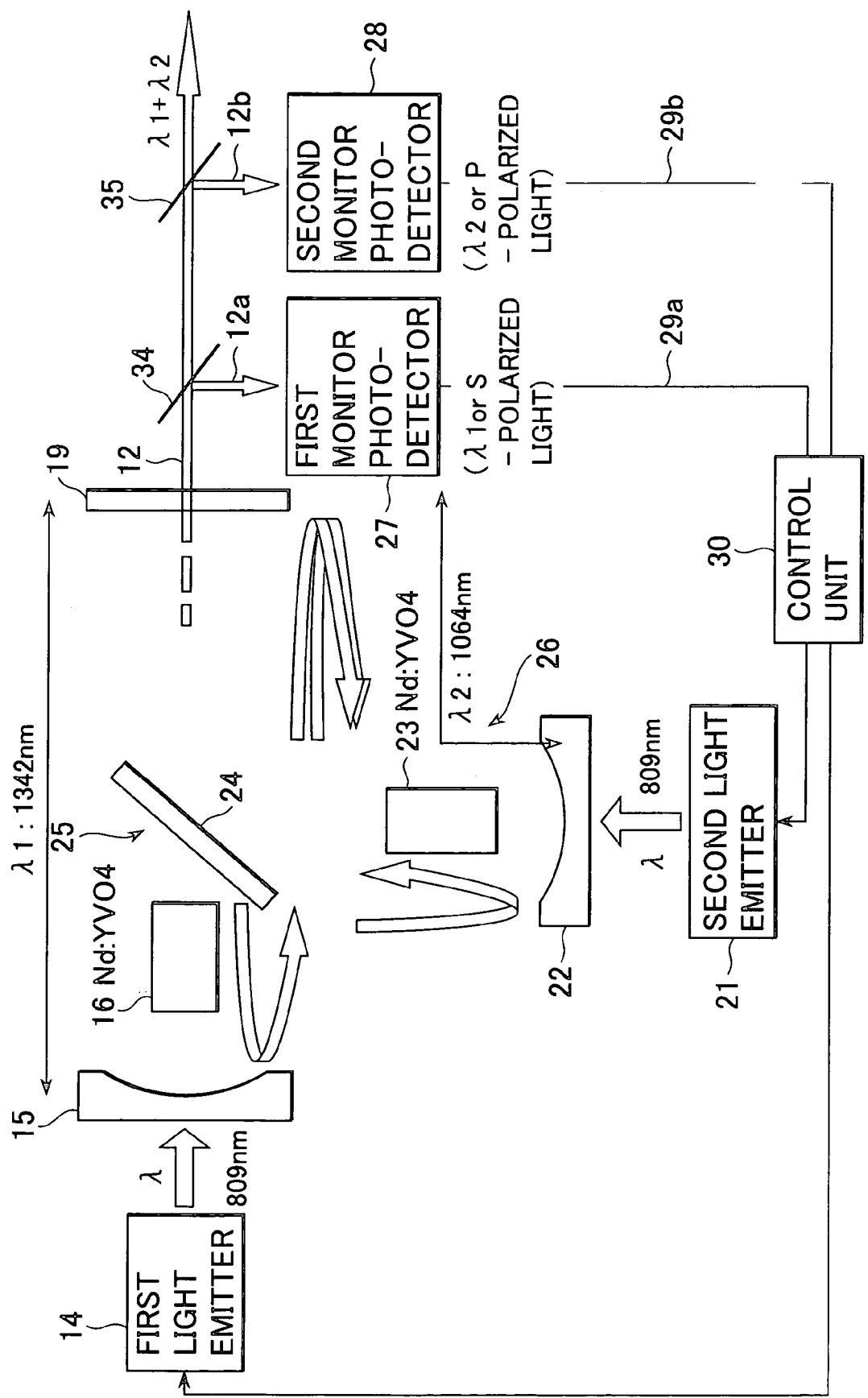
FIG. 1 is a schematical block diagram of an embodiment of the present invention.

Description will be given below on embodiments of the present invention referring to the drawings.

FIG. 1 shows a solid-state laser device provided with two resonators, and the two resonators commonly share a part of an optical axis and are designed to output laser beams on the same axis.

On a first optical axis, there are provided a first light emitting unit 14, a first concave mirror 15, a first solid-state laser medium (a first laser crystal) 16, and an output mirror 19.

A second optical axis crosses the first optical axis at a predetermined angle, e.g. at an angle of 90° between the first laser crystal 16 and the output mirror 19. There are provided a second light emitting unit 21, a second concave mirror 22, and a second solid-state laser medium (a second laser crystal) 23 on the second optical axis. A wavelength splitting plate 24 is arranged at a position where the first optical axis and the second optical axis cross each other. The second optical axis is deflected by the wavelength splitting plate 24, and a portion between the wavelength splitting plate 24 and the output mirror 19 is commonly shared by the first optical axis and the second optical axis.

The first concave mirror 15 is highly transmissive to a wavelength $\lambda$ being an excitation light and it is highly reflective to a wavelength $\lambda 1$ of a first fundamental wave. The output-mirror 19 is highly reflective to the wavelength $\lambda 1$ and a wavelength $\lambda 2$ of a second fundamental wave.

The second concave mirror 22 is highly transmissive to the excitation light $\lambda$, and it is highly reflective to the second fundamental wave $\lambda 2$. The wavelength splitting plate 24 is highly transmissive to the first fundamental wave $\lambda 1$, and it is highly reflective to the second fundamental wave $\lambda 2$. The components between the first concave mirror 15 and the output mirror 19 make up together a first resonator 25 for the first fundamental wave. The components between the second concave mirror 22 and the output mirror 19 make up together a second resonator 26 for the second fundamental wave.

On the optical axis on the output side of the output mirror 19, there are provided a first luminous flux splitting member 34 and a second luminous flux splitting member 35 such as half-mirrors for splitting luminous fluxes. The first luminous flux splitting member 34 splits a part of luminous flux of a laser beam 12 with the wavelength $\lambda 1$ projected from the output mirror 19, and a luminous flux 12a thus split is directed toward a first monitor photodetector 27. The first monitor photodetector 27 monitors the laser beam 12 projected from the solid-state laser device by receiving the luminous flux 12a. A photodetection signal 29a from the first monitor photodetector 27 is sent to a control unit 30, and the control unit 30 controls light emitting condition of the first light emitting unit 14 based on the photodetection signal 29a.

The second luminous flux splitting member 35 splits a part of luminous flux of the laser beam 12 with the wavelength $\lambda 2$ projected from the output mirror 19, and a luminous flux 12b thus split is directed toward a second monitor photodetector 28. The second monitor photodetector 28 receives the luminous flux 12b, and a photodetection signal 29b from the second monitor photodetector 28 is sent to the control unit 30. The control unit 30 controls light emitting condition of the second light emitting unit 21 based on the photodetection signal 29b.

The first luminous flux splitting member 34, the second luminous flux splitting member 35, the first monitor photodetector 27, and the second monitor photodetector 28 make up together a monitoring means for monitoring the projected laser beam 12.

In the above arrangement, the first light emitting unit 14 and the second light emitting unit 21 emit an excitation light with $\lambda$=809 nm, for instance. Nd:YVO$_4$ with oscillation line of 1342 nm or 1064 nm is used as the first laser crystal 16 and the second laser crystal 23 respectively.

The laser beam emitted from the first light emitting unit 14 passes through the first concave mirror 15 and is further reflected by the first concave mirror 15 within the first resonator 25. Then, the laser beam is converged to the first laser crystal 16, and a laser beam of the first fundamental wave with $\lambda 1$=1342 nm is oscillated between the first concave mirror 15 and the output mirror 19.

The laser beam emitted from the second light emitting unit 21 passes through the second concave mirror 22. Then, it is reflected by the output mirror 19 and the second concave mirror 22 within the second resonator 26 and is converged to the second laser crystal 23. Between the second concave mirror 22 and the output mirror 19, a laser beam of the second fundamental wave with $\lambda 2$=1064 nm is oscillated.

In the arrangement of the solid-state laser device as described above, the first resonator 25 and the second resonator 26 are separated from each other except the output mirror 19. Thus, the laser beam entering the first resonator 25 from the first light emitting unit 14 forms a converging point between the first concave mirror 15 and the wavelength splitting plate 24, and this converging point is positioned within or near the first laser crystal 16. Similarly, the laser beam entering the second resonator 26 from the second light emitting unit 21 forms a converging point between the second concave mirror 22 and the wavelength splitting plate 24, and this converging point is positioned within or near the second laser crystal 23.

Excitation efficiency of each of the first laser crystal 16 and the second laser crystal 23 is influenced by energy density or a direction of polarization of the laser beam. The positions of the first laser crystal 16 and the second laser crystal 23 can be adjusted independently, and the first laser crystal 16 and the second laser crystal 23 can be set at the optimal positions. Also, the direction of polarization can be adjusted independently for the first light emitting unit 14 and the second light emitting unit 21, and the adjustment can be performed in easy manner. Further, in the positional adjustment of optical components, e.g. optical axis alignment of the first concave mirror 15 and the second concave mirror 22, adjustment can be easily attained because adjustment of one component does not exert influence on the adjustment of the other. Thus, after the adjustment of one component has been completed, the other component can be adjusted.

Also, it is possible to completely align the commonly shared portion of the first optical axis and the second optical axis.

As described above, the laser beam $\lambda 1$ projected from the first resonator 25 is monitored via the first monitor photodetector 27. The light emitting condition of the first light emitting unit 14 can be independently controlled by the control unit 30. Also, the laser beam $\lambda 2$ projected from the second resonator 26 is monitored via the second monitor photodetector 28. The light emitting condition of the second light emitting unit 21 can be independently controlled by the control unit 30.

Figure 4:
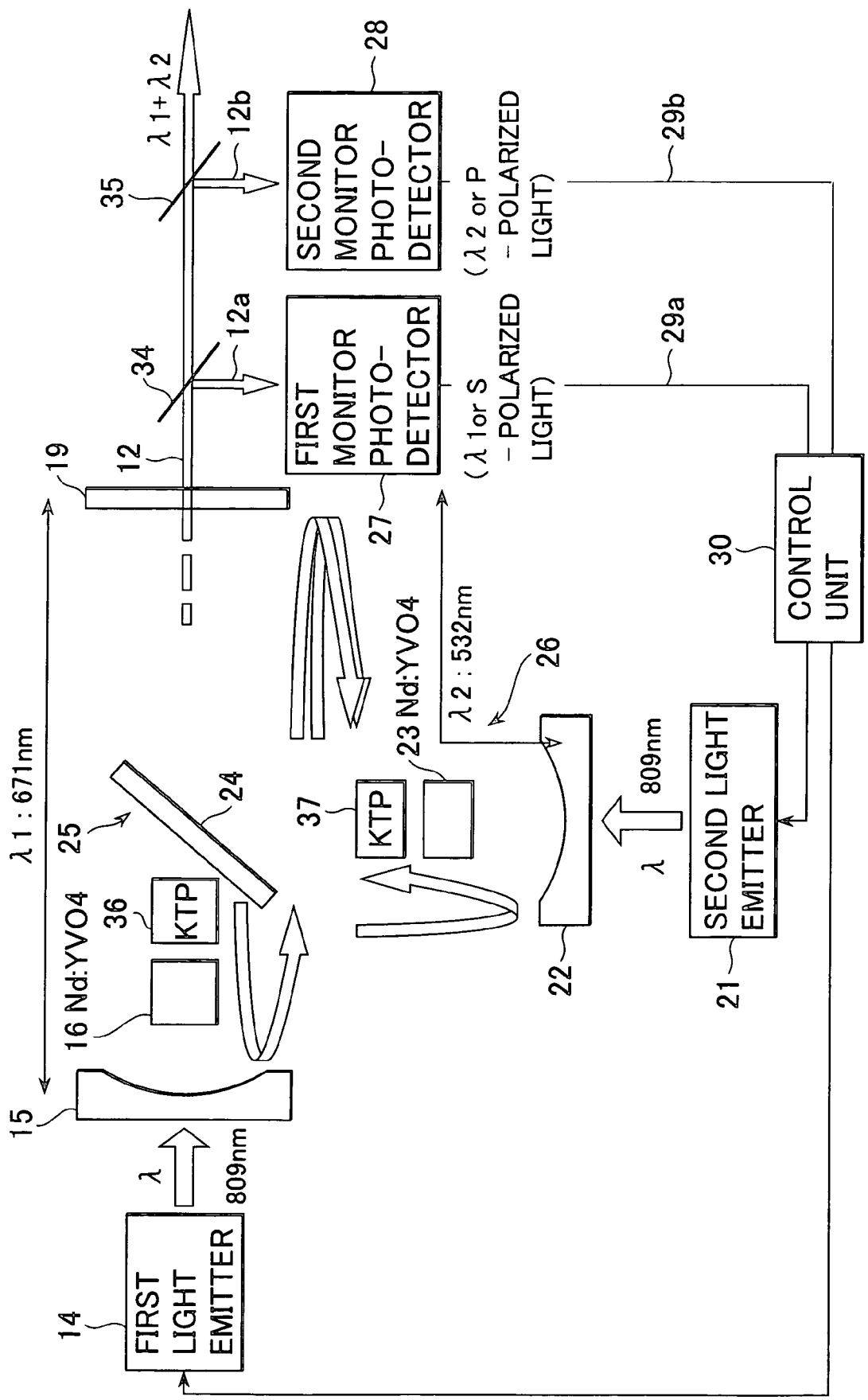
FIG. 4 is a schematical block diagram showing another embodiment of the present invention.
Figure 5:
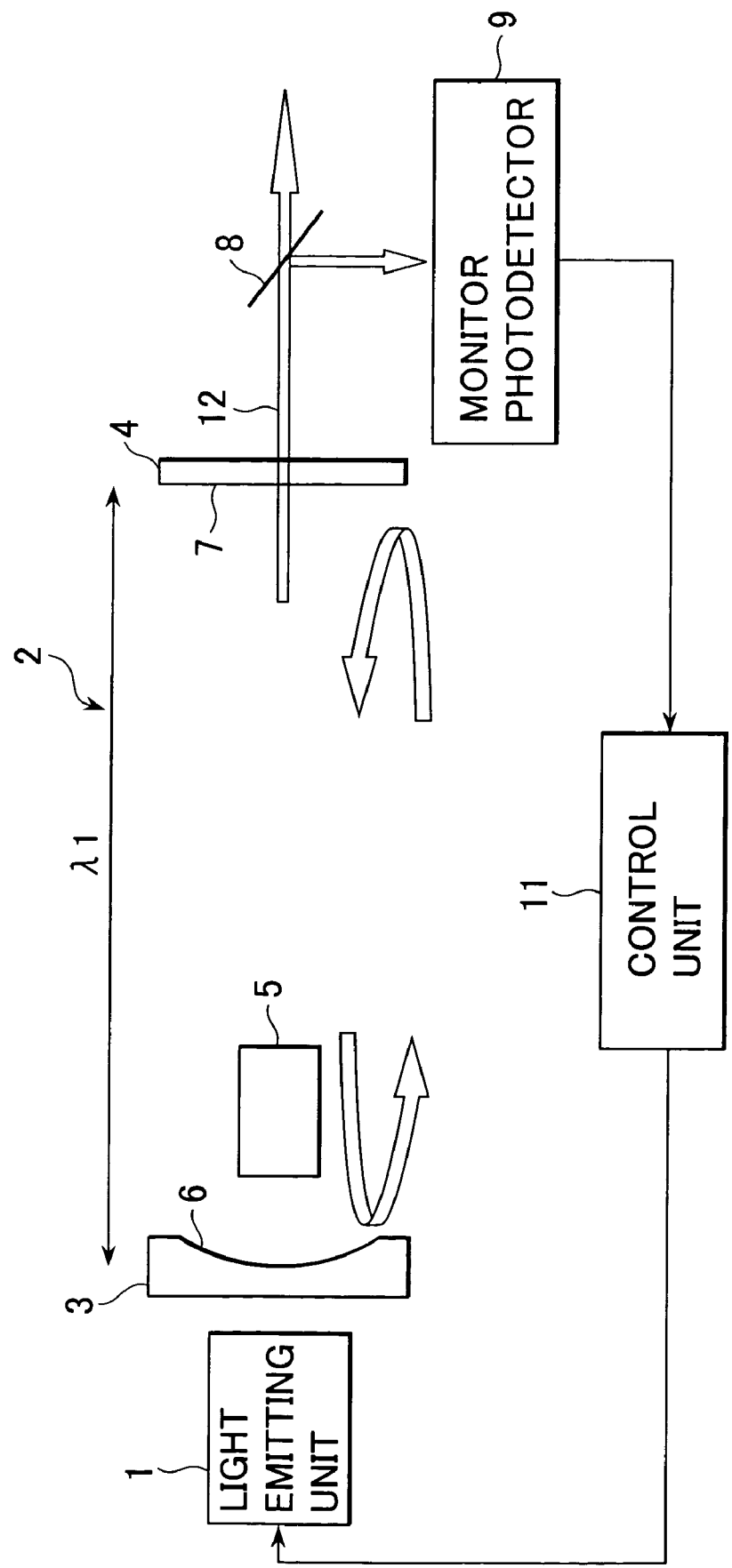
FIG. 5 is a block diagram of a conventional example.

Also, one or both of the first resonator 25 and the second resonator 26 may be designed in such manner that a second higher harmonic wave is obtained from intracavity type wavelength change. For instance, as shown in FIG. 4, a resonator may be constructed by inserting a crystal for wavelength conversion (e.g. KTP) 36 between the first laser crystal 16 and the wavelength splitting plate 24 so that a wavelength of 671 nm can be obtained. Similarly, a crystal for wavelength conversion (KTP) 37 may be inserted between the second laser crystal 23 and the wavelength splitting plate 24 so that a wavelength of 532 nm can be obtained.

By providing Q-sw between the second laser crystal 23 and the wavelength splitting plate 24 in one of the first resonator 25 or the second resonator 26 (e.g. the second resonator 26)(may be designed as removable with respect to the optical axis), a sharp pulsed light can be issued. Briefly, it is an arrangement where two resonators 25 and 26 commonly sharing the output mirror 19 can be independently driven.

Figure 2A:
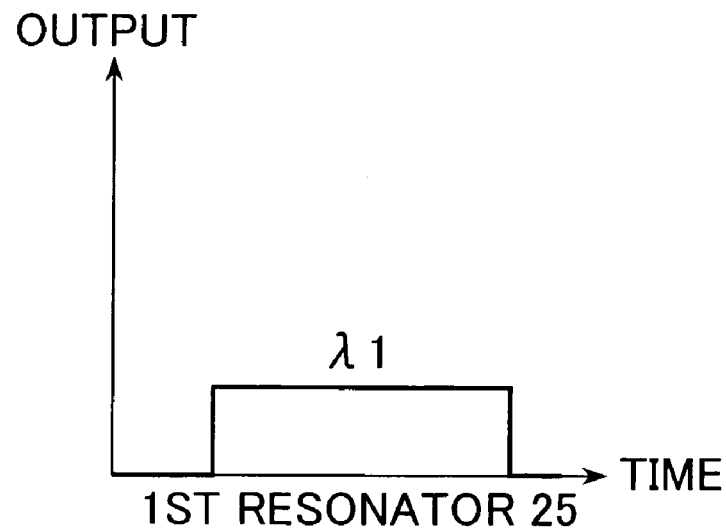
FIG. 2(A) and FIG. 2(B) each represents a diagram showing output condition of a laser beam in the embodiment of the present invention.
Figure 2B:
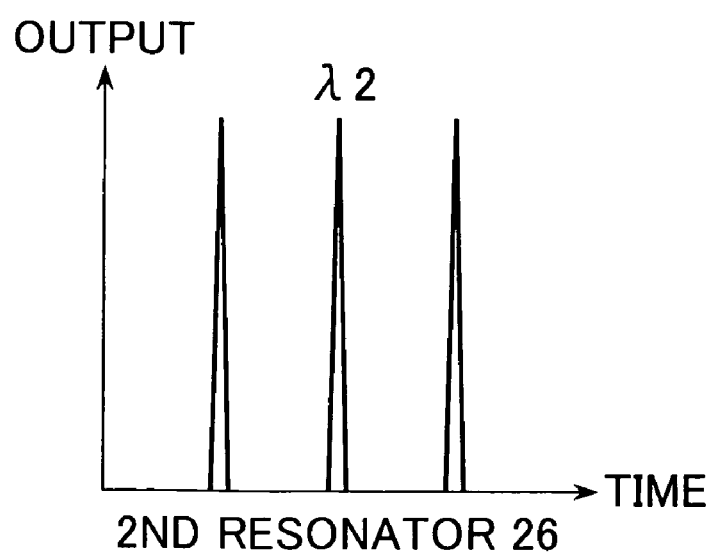

FIG. 2(A) and FIG. 2(B) each represents an aspect of the control of the laser beam projected from the first resonator 25 and the second resonator 26 respectively. The first resonator 25 is controlled, for instance, to continuous output or to long-time pulse although an output peak value is low (FIG. 2(A)). The output from the second resonator 26 is controlled to short-time pulse although an output peak value is high (FIG. 2(B)).

Further, FIGS. 3(A)–(H) each represents a pulse condition of the laser beam projected according to the other control conditions.

Figure 3A:
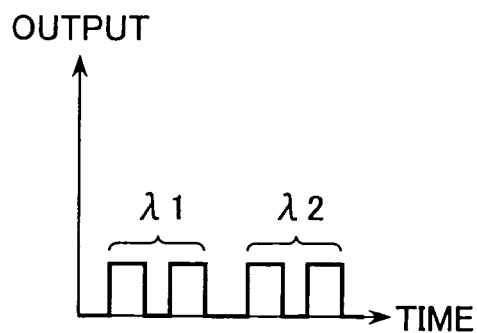
FIG. 3(A), FIG. 3(B), FIG. 3(C), FIG. 3(D), FIG. 3(E), FIG. 3(F), FIG. 3(G), and FIG. 3(H) each represents a diagram showing various output conditions of a laser beam in the embodiment of the present invention.

FIG. 3(A) shows a case where both of the laser beams projected from the first resonator 25 and the second resonator 26 are controlled to continuous output or to long-time pulse although output peak values are low. This figure shows a case where after heating with the laser beam $\lambda 1$, processing such as cleaning is performed by using the laser beam $\lambda 2$, or a case where a distance is measured by the laser beam $\lambda 1$ and processing such as heating, cleaning, etc. is performed by using the laser beam $\lambda 2$ when the conditions are met.

Figure 3B:
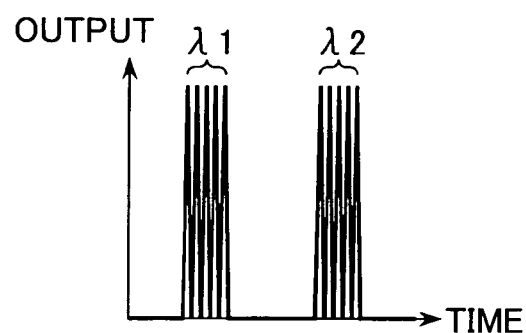

FIG. 3(B) shows a case where both of the laser beams projected from the first resonator 25 and the second resonator 26 are controlled to short-time pulse although output peak values are high. This figure shows a case where after heating with the laser beam $\lambda 1$, processing such as cleaning is performed by using the laser beam $\lambda 2$, or a case where a distance is measured by using the laser beam $\lambda 1$, and processing such as heating, cleaning, etc. is performed by using the laser beam $\lambda 2$ when the conditions are met.

Figure 3C:
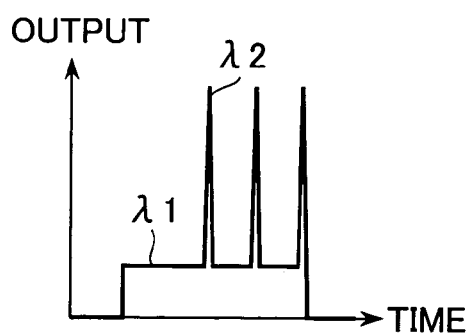

FIG. 3(C) shows a case where the laser beam $\lambda 1$ projected from the first resonator 25 is controlled to a continuous light, and the laser beam $\lambda 2$ projected from the second resonator 26 is controlled to short-time pulse although an output peak value is high. This figure shows a case where perforation processing is performed by the laser beam $\lambda 2$ while heating is carried out with the laser beam $\lambda 1$, or a case where perforation is performed by the laser beam $\lambda 2$ while a working surface is cleaned up by using the laser beam $\lambda 1$, or a case where perforation is performed with the laser beam $\lambda 2$ when the conditions are met while a distance is measured by the laser beam $\lambda 1$.

Figure 3D:
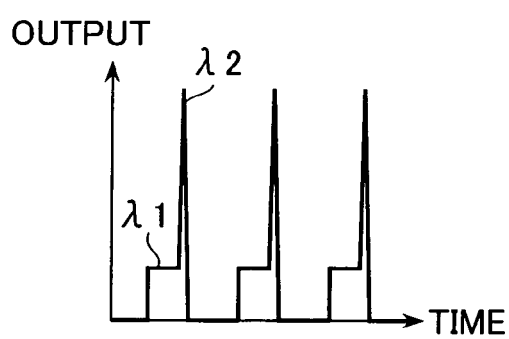

FIG. 3(D) shows a case where the laser beam $\lambda 1$ projected from the first resonator 25 is controlled to long-time pulse, and the laser beam $\lambda 2$ projected from the second resonator 26 is controlled to short-time pulse although an output peak value is high. The figure shows a case where perforation is performed with the laser beam $\lambda 2$ while heating is carried out with the laser beam $\lambda 1$, or a case where perforation is performed with the laser beam $\lambda 2$ while a working surface is cleaned up with the laser beam $\lambda 1$, or a case where perforation is performed with the laser beam $\lambda 2$ when the conditions are met while a distance is measured with the laser beam $\lambda 1$.

Figure 3E:
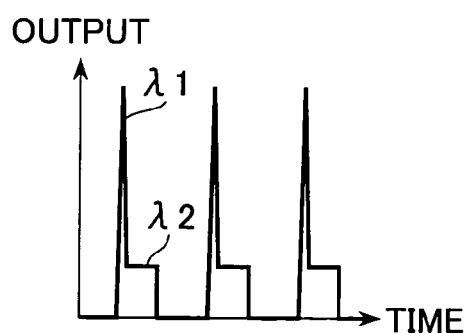

In FIG. 3(E), the laser beam $\lambda 1$ projected from the first resonator 25 is controlled to short-time pulse although an output peak value is high, and the laser beam $\lambda 2$ projected from the second resonator 26 is controlled to long-time pulse with a lower output peak value. This figure shows a case where perforation is performed with the laser beam $\lambda 1$ and annealing is performed by using the laser beam $\lambda 2$ or a case where perforation is performed with the laser beam $\lambda 1$ and a working surface is cleaned up by the laser beam $\lambda 2$.

Figure 3F:
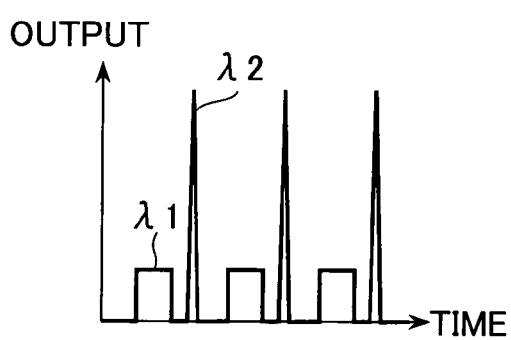

In FIG. 3(F), the laser beam from one of the first resonator 25 or the second resonator 26 is controlled to continuous output or long-time pulse although an output peak value is low, and the output from the other resonator is controlled to short-time pulse although an output peak value is high. This figure shows cases where perforation and annealing are performed or perforation and cleaning are performed alternately.

Figure 3G:
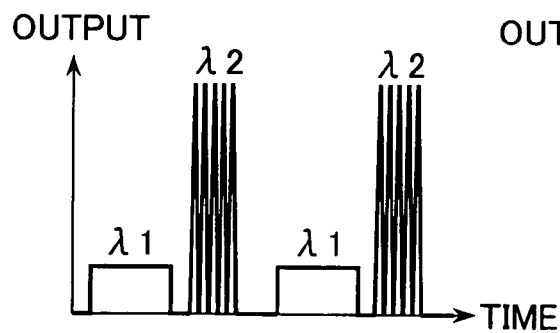

In FIG. 3(G), the output from the first resonator 25 is controlled to continuous output or long-time pulse although an output peak value is low, and the output from the second resonator 26 is controlled to short-time pulse although an output peak value is high. The figure shows a case where perforation is performed with the laser beam $\lambda 2$ only after heating with the laser beam $\lambda 1$, or a case where a distance is measured with the laser beam $\lambda 1$ and processing such as perforation is carried out by using the laser beam $\lambda 2$ only when the conditions are met.

Figure 3H:
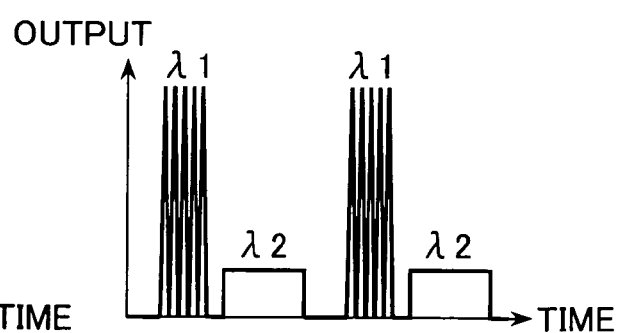

In FIG. 3(H), the output from the first resonator 25 is controlled to short-time pulse although an output peak value is high, and the output from the second resonator 26 is controlled to continuous output or long-time pulse although an output peak value is low. The figure shows a case where a distance is measured with the laser beam $\lambda 1$, and processing such as heating, cleaning, etc. is carried out by using the laser beam $\lambda 2$ when the conditions are met.

In the explanation as described above, an optical member for splitting wavelength is used as the first luminous flux splitting member 34 or the second luminous flux splitting member 35. The direction of polarization of the laser beam $\lambda 1$ from the first resonator 25 is different by an angle of 90° each other from that of the laser beam $\lambda 2$ of the second resonator 26. Therefore, it may be designed in such manner that a polarizing plate is used as the first luminous flux splitting member 34 or the second luminous flux splitting member 35, and s-component and p-component are split from the laser beam 12 and are monitored, and the laser beams projected from the first resonator 25 and the second resonator 26 may be controlled independently by automatic power control (APC).

Also, it may be designed in such manner that the laser beam with low peak is controlled by automatic power control only during the time when the laser beam with high peak is outputted, and the laser beam detected by monitoring and the light emitting unit controlled may be made as one set. With respect to such control, for example in FIG. 3(C), low peak control (APC) is carried out by the first resonator 25 up to immediately before high peak. The first light emitting unit 14 of the first resonator 25 immediately before turning to high peak control is controlled by automatic current control (ACC), and the APC is turned to the second resonator 26. At the same time as high peak is terminated, APC of the second resonator 26 is stopped, and the control of the first resonator 25 is brought back to APC. In view of the switching to APC or ACC and the retention of the data, it is preferable to perform digital control using CPU or the like.

Next, description will be given on an application of the solid-state laser device of the present invention.

When the laser beam is projected, an absorption property of energy and an attainable distance from a surface of the laser beam differs according to a wavelength of the laser beam. By adequately selecting a wavelength of the laser beam between the laser beam λ1 and the laser beam λ2, or by selecting both of the laser beam λ1 and the laser beam λ2, the laser beam can be used for medical application.

For instance, a drug preparation to be activated by the laser beam λ1 is injected to an affected site. Then, the laser beam λ1 is projected to the affected site. As a result, an absorption coefficient of the drug preparation can be selectively increased. When the laser beam λ2 is projected subsequently, the laser beam λ2 is absorbed only at the affected site, and heating occurs. This makes it possible to perform medical treatment intensively only to the affected site. No damage is given to the region other than the affected site.

Giving now some concrete examples, in case Photophrin is to be given as a photosensitizer in the treatment of cancer, a laser beam of 630 nm is used. When BPD-MA is to be given, a laser beam of 689 nm is used. When NPe6 is to be given, a laser beam of 664 nm is used. When ALA is to be given for the treatment of actinic keratosis, a laser beam of 633 nm is used. When ALA is to be given for the fluorescence diagnosis, a laser beam of 405 nm is used.

Nevus therapy is known as the treatment utilizing an absorption property of the laser beam at a site to be treated or an affected site. Laser beams of 694 nm and 1064 nm are used to treat birthmark or nevus such as brown nevus, blue nevus, tattoo, nevus of Ota, or deep skin layer. For the treatment of shallow skin layer, nevus spilus, red nevus, lentigo, verruca, etc., laser beams of 585 nm and 590 nm are used.

Further, projection of laser beams with two wavelengths can be applied for the treatment as given below:

For instance, in the selective photocoagulation therapy using a micro pulse wave to treat macular degeneration, which is one of retinal lesions, a temperature at the treated site is gradually increased when a pulsed wave is irradiated at high frequency. Another type of laser beam different from a therapeutic light is irradiated, and a photo-acoustic signal is measured. The temperature of the treated site is monitored, and thermal damage at the treated site can be prevented.

At the same time with the photocoagulation therapy, a laser beam for OCT (optical coherence tomography) is projected coaxially. As a result, image acquirement of the treated site and the photocoagulation therapy can be carried out at real time. Imaging and treatment of a cornea can also be executed at real time by selecting the wavelength.

When a photosensitive material NPe6 is given into body of a patient, NPe6 has a property to be discharged from normal tissues more rapidly than from a focal site. Therefore, NPe6 is accumulated more on the affected site as a predetermined time elapses. Thus, when laser beams with wavelengths of 405 nm and 664 nm (i.e. absorption bands of NPe6) are projected, it is possible to observe fluorescent spectrum or its image. For instance, it is possible to obtain fluorescent images of aortoiliac atherosclerosis or submucosal tumor of esophagus.

By irradiating laser beams with two wavelengths, observation of the fluorescent image and PDT (photodynamic therapy) can be carried out at the same time.

In a laser surgical operation, when a laser beam of 3 μm capable of precise incision (with high absorption rate to absorb water) and a laser beam of 2 μm with coagulating and hemostatic effects (hemostatic effect associated with protein coagulation) are coaxially projected to the treated site, incision and hemostasis using laser beams can be carried out at the same time, and it is possible to alleviate the burden on the patient. For example, this method is used in orthopedic surgery, otolaryngology, and endoscopic surgery.

Further, it is known that near infrared laser beams (wavelengths 830 nm and 904 nm) causing neither damage nor degeneration in cells and protein can alleviate various types of pain. When laser surgery is to be performed to a site with algesic nerve such as skin, the pain can be reduced if the near infrared laser beam is projected before, during and after the operation in addition to the projection of the laser beam for surgical purpose.

Also, in the surgical operation using laser beams, absorption occurs in shallow layer in case of the laser beam with short wavelength and in deep layer in case of the laser beam with long wavelength. By performing surgical operation using the laser beam with two wavelengths, the affected sites in layers with different depths can be treated at the same time, and the burden on the patient can be alleviated.

Further, when there are different types of pigments with different absorption properties on the same affected site, the same affected site can be treated at the same time if a laser beam with two wavelengths to match the different types of pigments is used. This makes it possible to improve treatment accuracy and to reduce duration of the surgery, thus alleviating the burden on the patient.

The present invention provides a solid-state laser device, which comprises a first resonator for projecting a first laser beam and a second resonator for projecting a second laser beam, wherein the first resonator and the second resonator commonly share a part of an optical axis and an output mirror, and which comprises a first light emitting unit for the first resonator, a second light emitting unit for the second resonator, a monitoring means for splitting and monitoring a part of the first laser beam and for splitting and monitoring a part of the second laser beam among the laser beams projected from the output mirror, and a control unit for controlling at least one of the first light emitting unit and the second light emitting unit based on a detection result from the monitoring means. As a result, it is possible to independently control laser beams projected from the two resonators and to project laser beams of various aspects.

Also, the first laser beam has a wavelength different from a wavelength of the second laser beam. This makes it possible to carry out different modes of processing at the same time by using the laser beams with two different wavelengths.

Further, the control unit controls one of the first light emitting unit and the second light emitting unit so that a short-time pulse with higher output peak value can be issued and the control unit controls the other of the light emitting units to continuous or long-time pulse with lower output peak value. This makes it possible to carry out different modes of processing approximately at the same time.

What is claimed is:

1. A solid-state laser device, which comprises a first resonator for projecting a first laser beam and a second resonator for projecting a second laser beam, wherein said first resonator and said second resonator commonly share a part of an optical axis and an output mirror, and which comprises a first light emitting unit for said first resonator, a second light emitting unit for said second resonator, a monitoring means for splitting and monitoring a part of said first laser beam and for splitting and monitoring a part of said second laser beam among the laser beams projected from said output mirror, and a control unit for controlling at least one of said first light emitting unit and said second light emitting unit based on a detection result from said monitoring means, wherein said control unit controls the projection of said first laser beam and said second laser beam so that said first laser beam and said second laser beam are projected in different modes.

2. A solid-state laser device according to claim 1, wherein said monitoring means comprises a first monitoring means for monitoring said first laser beam and a second monitoring means for monitoring said second laser beam, and said control unit can independently control said first light emitting unit and said second light emitting unit.

3. A solidstate laser device according to claim 2, wherein a wavelength of the first laser beam is different from a wavelength of the second laser beam.

4. A solid-state laser device according to claim 2, wherein a direction of polarization of the first laser beam is different from a direction of polarization of the second laser beam.

5. A solid-state laser device according to claim 2, wherein said control unit controls said first light emitting unit so that said first light emitting unit can emit a pulse with a higher output peak value and emit shorter-time pulse than the output of said second light emitting unit, and wherein said control unit controls said second light emitting unit so that said second light emitting unit can emit a second pulse with a lower output peak value and continuously or longer-time pulse than the output of said first light emitting unit.

6. A solid-state laser device according to claim 1, wherein said first laser beam is a beam for administering therapy to a site of a patient to be treated, and said second laser beam is a beam for measuring a photo-acoustic signal to monitor the temperature of the treated site.

7. A solid-state laserdevice according to claim 1, wherein said first laser beam is a photocoagulation therapy beam, and said second laser beam is a beam for optical coherence tomography, wherein the acquisition of an image of a treated site and the photocoagulation therapy are carried out in real time, or the imaging and treatment of a cornea is executed in real time by selecting the wavelength.

8. A solid-state laser device according to claim 1, wherein said first laser beam and said second laser beam have wavelengths of 405 nm and 664 nm (absorption bands of Npe6) and wherein observation of the fluorescent image and photodynamic therapy are carried out at the same time by projecting said first laser beam and said second laser beam.

* * * * *